United States Patent [19]

Saito

[11] 4,432,849

[45] Feb. 21, 1984

[54] METHOD AND APPARATUS FOR SEPARATING MACROMOLECULES OR PARTICLES IN A LIQUID SOLUTION

[75] Inventor: Takayasu Saito, Tokyo, Japan

[73] Assignee: Hitachi Koki Company, Limited, Tokyo, Japan

[21] Appl. No.: 511,133

[22] Filed: Jul. 6, 1983

[30] Foreign Application Priority Data

Jul. 9, 1982 [JP] Japan ................................ 57-120159

[51] Int. Cl.³ ...................... G01N 27/26; G01N 33/16
[52] U.S. Cl. ............................. 204/180 R; 204/180 P; 204/180 B; 204/299 R; 204/301; 209/148; 209/642
[58] Field of Search ............... 204/180 R, 299, 180 P, 204/180 B, 301

[56] References Cited

U.S. PATENT DOCUMENTS

3,791,950 12/1974 Allwgton ........................... 204/299
4,124,470 11/1978 Dahms ............................ 204/180 R

*Primary Examiner*—Arthur P. Demers
*Attorney, Agent, or Firm*—Pollock, Vande Sande & Priddy

[57] ABSTRACT

A solution of macromolecules or other particles suspended therein is subjected to a centrifugal force applied in one direction and simultaneously to a force imposed in a direction opposite to said one direction by an electric field applied, thereby separating the particles into a position in which the centrifugal force counterbalances the force imposed by the electric field.

6 Claims, 8 Drawing Figures

METHOD AND APPARATUS FOR SEPARATING MACROMOLECULES OR PARTICLES IN A LIQUID SOLUTION

BACKGROUND OF THE INVENTION

The present invention relates to a method and an apparatus for separating macromolecules, living cells or other particles in a liquid solution by way of electrophoresis effected under a centrifugal force to collect the particles into a position where the centrifugal force counterbalances the force due to an electric field applied.

SUMMARY OF THE INVENTION

It is an object of the present invention to provide a method of effectively separating different kinds of particles under condensed state from a solution of mixture of such particles under an electric field and a centrifugal force applied.

Another object of the present invention is to provide an apparatus for carrying out the foregoing method.

According to the present invention, a solution of macromolecules or other particles suspended therein is subjected to a centrifugal force applied in one direction and simultaneously to a force imposed in a direction opposite to said one direction by an electric field applied, thereby separating the particles into a position in which the centrifugal force counterbalances the force imposed by the electric field.

BRIEF DESCRIPTION OF THE DRAWINGS

The present invention will be described in detail by way of illustrative example with reference to the accompanying drawings, in which.

DETAILED DESCRIPTION

Figure 1:
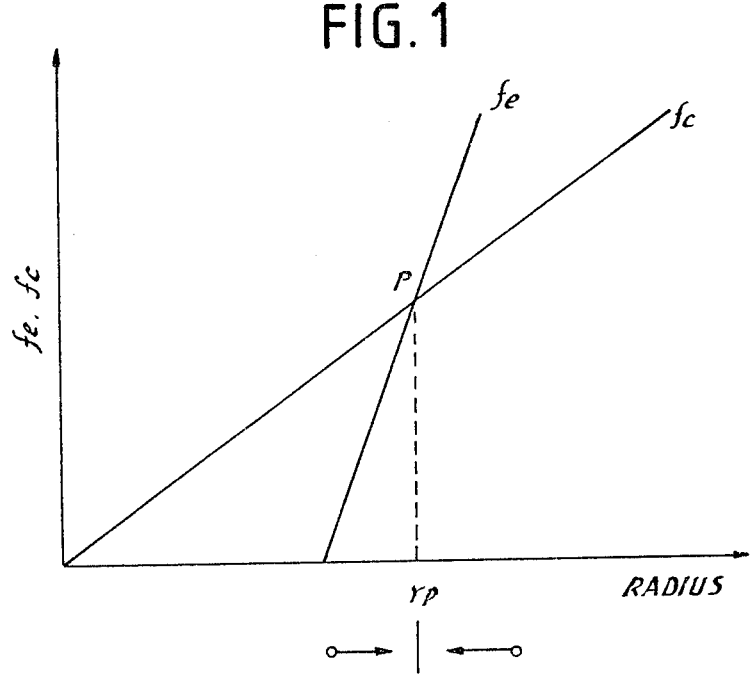
FIG. 1 is a graph showing the relationship between the radius of a circular path along which a particle travels and a centrifugal force and a force due to an electric field applied.

When a particle having an electric charge Q, a mass M and a specific volume $v$ is subjected to both a centrifugal force fc and a force fe due to an electric field having a magnitude E applied in a direction opposite to that of the centrifugal force fc, the particle undergoes a force f which is expressed by:

$$f = fc - fe = M(1 - v\rho)\omega^2 r - QE$$

where $\rho$ is the density of the particle, $\omega$ is the angular velocity, and r is the radius of a circle along which the particle rotates. FIG. 1 of the accompanying drawings shows the magnitudes of the forces fe, fc plotted against the distance of the particle from the axis of rotation. Study of the foregoing equation indicates that there is a point rp where the centrifugal force fc and the force fe due to the electric field applied are equal to each other, as shown in FIG. 1, by selecting a suitable speed of rotation of the particle under the condition that the magnitude E increases as the radius r increases beyond a certain point from the center of rotation. When the particle is positioned at a location closer than the point rp to the center, the particle is subjected to the force fc which is greater than the force fe and moves to the point rp under the force fc. When the particle is placed in a position remoter than the point rp from the center, the particle is moved to the point rp under the force fe. At any rate, the particle has a tendency of moving toward the same position wherever it may be located.

The present invention employs an ion exchange membrance. More specifically, a positive ion exchange membrance is used for separating negatively charged particles, and a negative ion exchange membrance is used for separating positively charged particles.

Figure 2:
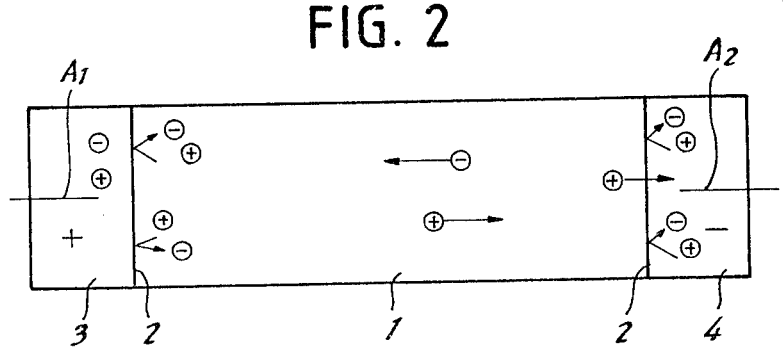
FIG. 2 is a schematic diagram illustrating movements of ions.

As shown in FIG. 2, a positive ion exchange membrane 2 is mounted on an anode side of an electrophoretic tank 1 to prevent negative ions from moving into an anode tank 3 accommodating an anode A1, thereby allowing positive ions to be accumulated on the anode side of the tank 1. Conversely, ions are prevented from being moved out of a cathode tank 4 accommodating a cathode A2 into the tank 1, and thus the ion concentration is reduced on a cathode side of the tank 1. Accordingly, the ion concentration gradient in the tank 1 is such that the ion concentration is progressively reduced from the anode side toward the cathode side of the tank 1. With an axis of rotation of the tank 1 being located on the anode side thereof, the potential gradient in the tank 1 is progressively greater away from the axis of rotation.

Figure 3:
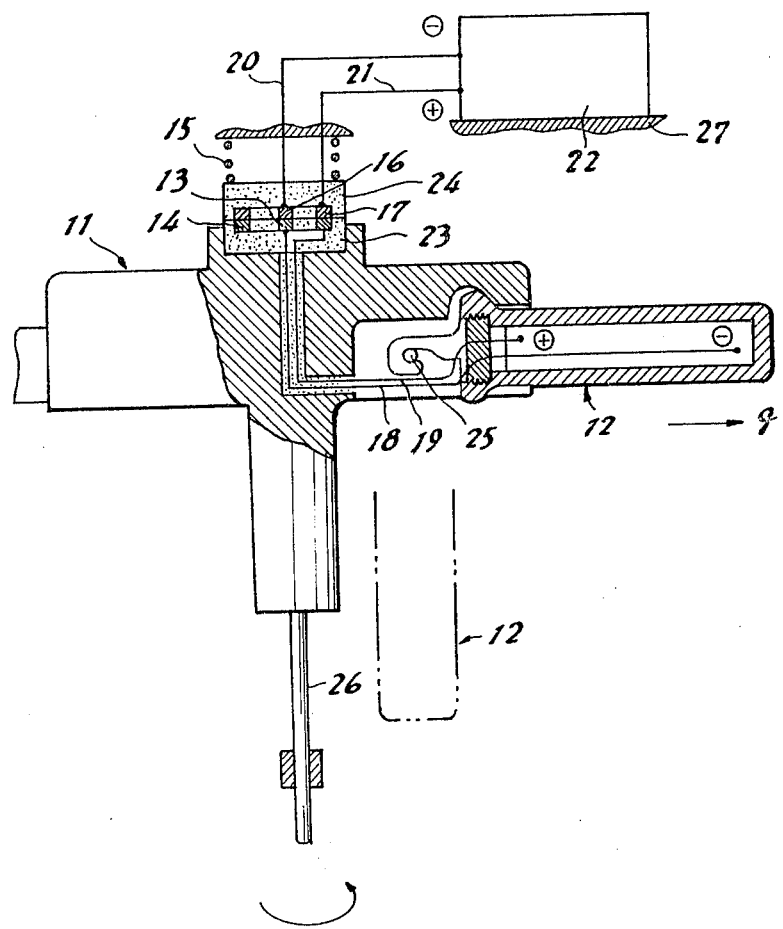
FIG. 3 is a vertical cross-sectional view of an apparatus for carrying out a method according to the present invention.
Figure 4:
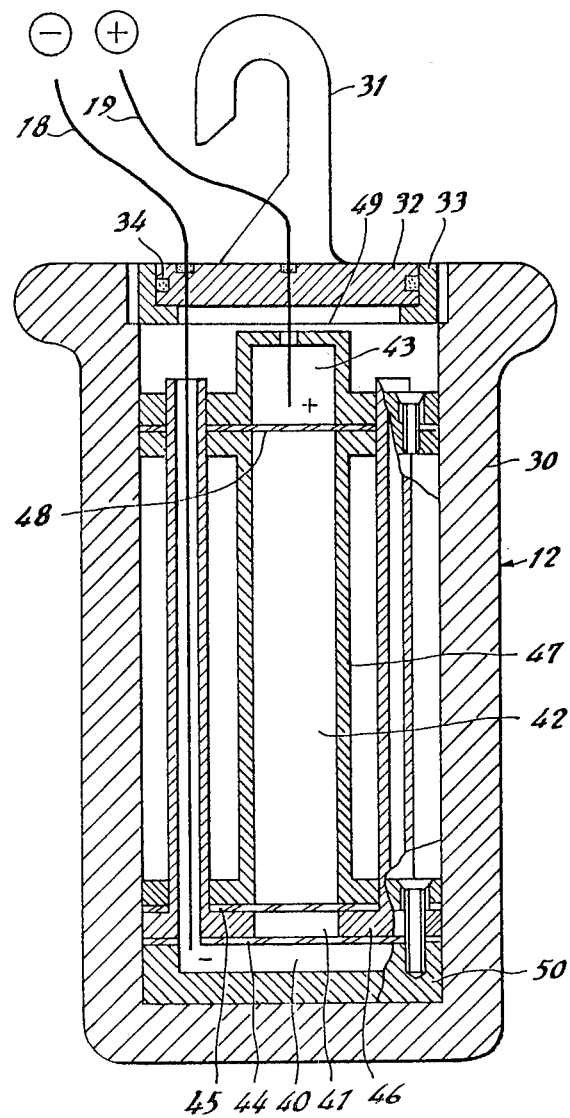
FIG. 4 is a longitudinal cross-sectional view of a centrifugal electrophoretic tube in the apparatus shown in FIG. 3.

As shown in FIGS. 3 and 4, an apparatus for reducing a method of the invention to practice comprises a rotor 11 rotatable by a drive shaft 26 connected to a motor (not shown) and a centrifugal electrophoretic tube 12 pivotably supported by a pin 25 on the rotor 11. When the rotor 11 is held at rest, the centrifugal electrophoretic tube 12 is dependent substantially vertically from the rotor 11 as shown by a two-dot-and-dash line. As the rotor 11 rotates at an increasing speed, the tube 12 is gradually lifted under a centrifugal force. When the rotor 11 rotates at a certain speed, the tube 12 is maintained substantially horizontally.

The rotor 11 supports on its upper central portion an electrically conductive slider 13 and an annular electrically conductive slider 14 disposed around the central slider 13 in concentric relation thereto. The central slider 13 and the annular slider 14 are mounted in an insulator 23 retained on the rotor 11 and electrically insulated thereby. Another central electrically conductive slider 16 and another annular electrically conductive slider 17 are disposed in slidable contact with the central and annular sliders 13, 14, respectively. The central and annular sliders 16, 17 are electrically insulated by another insulator 24 urged by a spring 15 to force the central and annular sliders 13, 14 into slidable contact with the central and annular sliders 16, 17. The central and annular sliders 13, 14 are connected to a pair of lead wires 18, 19, respectively, extending through the rotor 11 and having terminals serving as electrodes in the centrifugal electrophoretic tube 12. The central and annular sliders 16, 17 are connected through a pair of lead wires 20, 21 to negative and positive terminals of a DC voltage generator 22 fixed to a frame 27.

FIG. 4 illustrates the centrifugal electrophoretic tube 12 in greater detail. The centrifugal electrophoretic tube 12 is composed of a bottomed cylindrical bucket 30 and a cap 32 fitted in a retainer 33 threaded in an open end of the bucket 30 with an O-ring 34 interposed between the cap 32 and the retainer 33 in liquidtight relation. The bucket 30 has a hook 31 mounted on the open end thereof for engagement with the pin 25 (FIG. 3).

The cylindrical bucket 30 has therein a cathode tank 40, an electrolyte container tank 41, an electrophoretic tank 42, and an anode tank 43 arranged in the order named from the bottom of the bucket 30. The cathode tank 40 is defined between a bottom piece 50 and a positive ion exchange membrane 44, and the electrolyte container tank 41 is defined between the positive ion exchange membrane 44, another positive ion exchange membrane 45, and a piece 46. The electrophoretic tank 42 is defined between the positive ion exchange membrance 45, a piece 46, and a positive ion exchange membrane 48, and the anode tank 43 is defined between the positive ion exchange membrane 48 and a top piece 49.

The terminal of the lead wire 18 serves as a negative terminal disposed in the cathode tank 40, while the terminal of the lead wire 19 serves as a positive terminal disposed in the anode tank 43.

The electrolyte container tank 41 bounded by the ion exchange membrane 44 is needed because if there were no such electrolyte container tank 41, as shown in FIG. 2, the ion concentration would be extremely lowered in the vicinity of the membrane close to the cathode in the electrophoretic tank, resulting in a substantially insulated condition. With the electrolyte container tank 42 containing an electrolytic solution of high concentration, a small quantity of negative ions is supplied into the electrophoretic tank 42 to maintain a desired current.

The apparatus of the foregoing construction is employed with the following materials incorporated therein to obtain experimental data in the following examples:

Ion exchange membranes: K101 (Commercial name) manufactured by Asahi Chemical Industry Co., Ltd.
Sample: Latex TD-1, TD-2 manufactured by Japan Synthetic Rubber Co., Ltd.
Electrode solution:
  Anode tank—an aqueous solution of 0.5 M of trisodium citric acid
  Cathode tank—an aqueous solution of 0.15 M of acetic acid and 0.1 M of sodium chloride
Solution in the electrolyte container tank: an aqueous solution of 4.6 M of acetic acid and 0.4 M of acetic soda The solution in the electrophoretic tank was given a rectilinear concentration gradient with cane sugar used for the purpose of preventing convection due to Joule heat. The electrolyte used comprised sodium acetate. In Example 1, the electrolyte had a uniform concentration, and in Examples 2 and 3, the electrolyte had a concentration gradient rendered upwardly concave through a method described later (see FIG. 6). A potential in the electrophoretic tank 42 was measured by electrodes embedded in the piece 47 at constant intervals.

EXAMPLE 1

Figure 5:
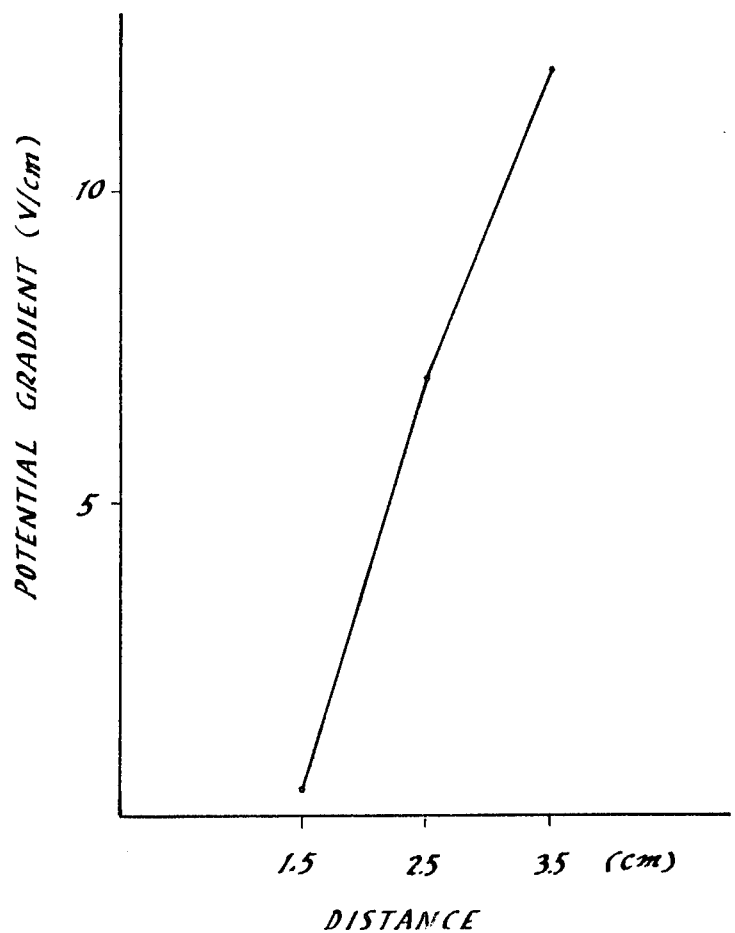
FIG. 5 is a graph showing a potential gradient.

A solution of 10 mM of acetic soda and a solution of 10 mM of acetic soda and 15% of cane sugar were contained in the electrophoretic tank 42. The cane sugar was given a rectilinear density gradient of 15%–0% from the cathode to the anode, and the acetic soda was rendered uniform in concentration. A current was passed through the solutions at a voltage of 50 V. As a result, a substantially rectilinearly increasing potential gradient was obtained 5 hours later as shown in FIG. 5.

EXAMPLE 2

Figure 6:
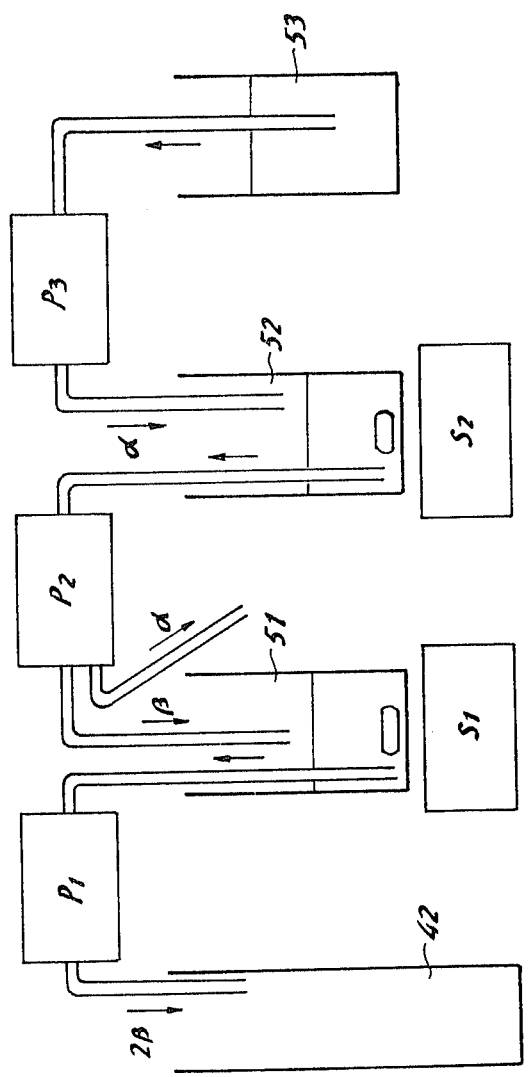
FIG. 6 is a schematic diagram showing an apparatus for producing a concentration gradient.
Figure 7:
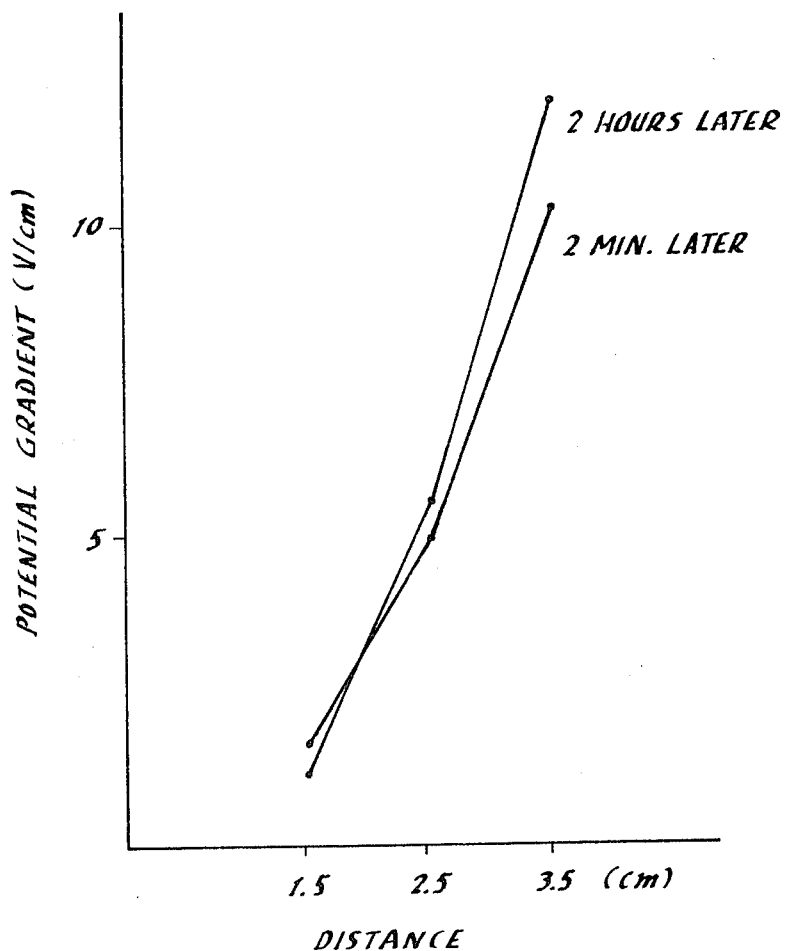
FIG. 7 is a graph illustrating potential gradients.

It took a long time for Example 1 to obtain a desired potential gradient. To avoid this, the electrolyte was given a density gradient in advance. Since the electric resistance is substantially inversely proportional to the density of the electrolyte, it is preferable that the density gradient of the electrolyte be reduced from the anode to the cathode in inverse proportion to the distance. This condition was approximately met by the arrangement shown in FIG. 6. In FIG. 6, each of tanks 51, 52 contains a solution in the amount which is half of that of the solution in the electrophoretic tank. The tanks 51, 52 are provided with stirrers S1, S2, respectively. The solution was supplied by a pump P3 at a speed $\alpha$ from a tank 53 to the tank 52, and then was discharged at the same speed $\alpha$ by a pump P2 from the tank 52 while the solution was being stirred by the stirrer S2. Simultaneously, the solution from the tank 52 was delivered at a speed $\beta$ by the pump P2 into the tank 51. Likewise, the solution was introduced by a pump P1 at a speed $2\beta$ from the tank 51 into the electrophoretic tank 42, thereby adjusting a separation layer in the electrophoretic tank 42. With this arrangement, the density of the electrolyte in the electrophoretic tank was approximately inversely proportional to the distance by selecting the speed ratio $\alpha/\beta$ to be 0.3 or smaller. In Example 2 and Example 3 (described later), the speed ratio $\alpha/\beta$ was selected to be 0.24.

The solutions contained in the tanks 51, 52, 53 were:
The tank 51: a solution of 2 mM of acetic soda and 15% of cane sugar
The tank 52: a solution of 2 mM of acetic soda and 1% of cane sugar
The tank 53: a solution of 50 mM of acetic soda and 1% of cane sugar The electrophoretic tank 42 was supplied with a separation layer adjusted with the cane sugar having a rectilinear density gradient of 15%–1% from the cathode to the anode and the acetic soda in the tank 42 having an upwardly concave density gradient of 2 mM to 50 mM. In addition to the separation layer, 100 mM of acetic soda was filled as a sample layer in the electrophoretic tank 42. A current was passed at a voltage of 50 V to measure a potential gradient. The measured potential gradient was substantially rectilinear, increasing immediately after the current was passed, and remained stable for at least 2 hours.

EXAMPLE 3

Since a stable potential gradient was obtained in Example 2, a solution in which two mixed kinds of latex were suspended was used to separate these latexes. The solutions used were as follows:
The tank 51: a solution of 2 mM of acetic soda and 8% of cane sugar Sample solution: a solution of 100 mM of acetic soda and 0.5% of cane sugar in which latexes TD-1 and TD-2 were suspended The tanks 52, 53, the electrode tanks, and the electrolyte container tank 41 contained the same solutions as described in Example 2.

Figure 8:
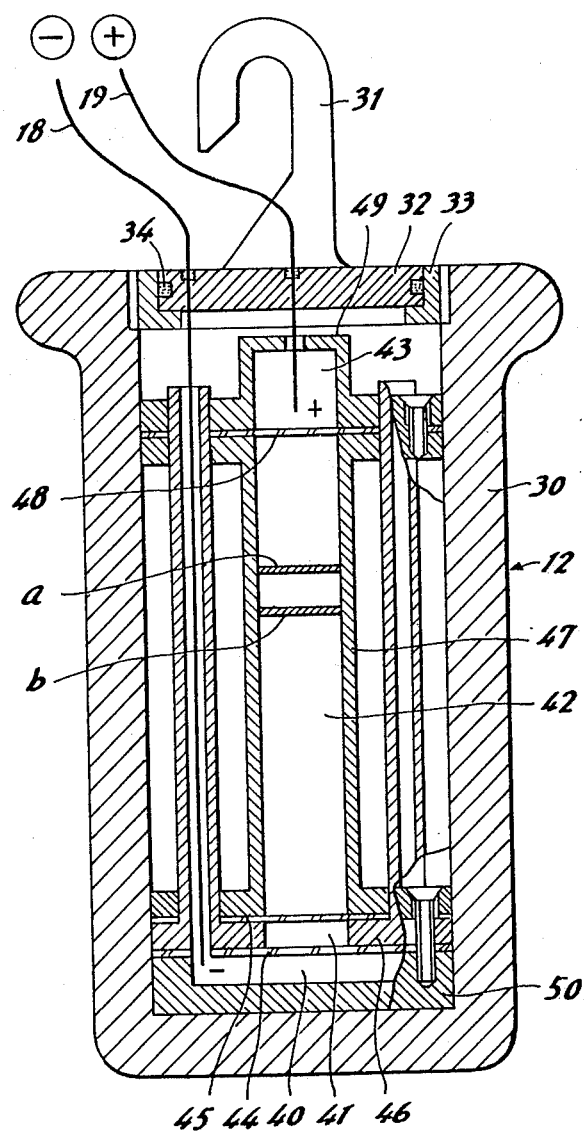
FIG. 8 is a longitudinal cross-sectional view of the centrifugal electrophoretic tube, illustrating particles separated according to the method of the invention.

The separation layer in the electrophoretic tank 42 was adjusted in the same manner as described in Example 2, and the sample solution was added as a layer on the separation layer, followed by a solution of 100 mM of acetic soda filled in a small quantity on the sample solution. The solutions in the electrophoretic tank 42 were then subjected to a centrifugal force of 1,800 g (at the center of the electrophoretic tank 42) at a voltage 50 V applied for 30 minutes under a cooled condition. As a consequence, the latexes TD-1 and TD-2 were separated as narrow strips a, b, respectively, as illustrated in FIG. 8.

As is apparent from the foregoing Examples, the components or particles in the solution can be separated as narrow strips even when the sample layer is thick.

Although not described in detail, the composition of the electrolyte is an important factor in the present invention and should meet the condition that there be a large quantity of non-separated electrolyte to supply ions which will be consumed when a current is passed. This enables the electrophoretic tank to be supplied ions for a long period of time. For this reason, the solution of acetic acid and acetic soda of high density was used as the solution in the electrolyte container tank.

Although a certain preferred embodiment of the present invention has been shown and described in detail, it should be understood that various changes and modifications may be made therein without departing from the scope of the appended claims.

What is claimed is:

1. A method of separating particles in a solution, comprising the steps of applying a centrifugal force to the solution in one direction and simultaneously subjecting the solution to a force imposed in a direction opposite to said one direction by an electric field applied, thereby separating the particles into a position in which said centrifugal force counterbalances said force imposed by the electric field.

2. A method according to claim 1, wherein said solution has a substantially rectilinear density gradient between electrodes across which said electric field is applied.

3. A method according to claim 1, further including the step of supplying ions to said solution.

4. An apparatus for separating particles in a solution, comprising a rotor rotatable about its own axis, a centrifugal electrophoretic tube pivotably supported on said rotor and having an electrophoretic tank and a pair of first and second electrodes disposed on a longitudinal axis of said tube across said electrophoretic tank, said centrifugal electrophoretic tube being positioned eccentrically with respect to said rotor so that, when said rotor is rotated about the own axis thereof, said centrifugal electrophoretic tube can be subjected to a centrifugal force substantially aligned with said longitudinal axis of said tube, and an electric coupling unit mounted on said rotor for allowing said first and second electrodes to be electrically connected continuously to an external power source during rotation of said rotor.

5. An apparatus according to claim 4, wherein said rotor comprises a first electrode tank housing therein said first electrode and bounded by a first ion exchange membrane, a second electrode tank housing therein said second electrode and bounded by a second ion exchange membrane, and an electrolyte container tank defined between said first ion exchange membrane and a third ion exchange membrane spaced therefrom, said centrifugal electrophoretic tank being defined between said second and third ion exchange membranes.

6. An apparatus according to claim 4, wherein said electric coupling unit comprises a first insulator mounted on said rotor, a first central electrically conductive slider mounted in said first insulator, a first annular electrically conductive slider mounted in said first insulator and disposed around said first slider in concentric relation, said first and second electrodes being electrically connected to said first central and annular sliders, respectively, a second insulator slidably mounted on said first insulator, a second central electrically conductive slider mounted in said second insulator, a second annular electrically conductive slider mounted in said second insulator and disposed around said second slider in concentric relation, said second central and annular sliders being electrically connected slidably to said first central and annular sliders, respectively, and adapted for electric connection to the external power source, and resilient means for normally urging said second insulator into slidable contact with said first insulator.

* * * * *